United States Patent
Kino et al.

(10) Patent No.: US 8,573,633 B2
(45) Date of Patent: Nov. 5, 2013

(54) SEAT CUSHION AIRBAG APPARATUS

(75) Inventors: Masao Kino, Kiyosu (JP); Tatsuya Hashido, Kiyosu (JP); Takanori Kanto, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 23 days.

(21) Appl. No.: 13/355,650

(22) Filed: Jan. 23, 2012

(65) Prior Publication Data

US 2012/0193953 A1 Aug. 2, 2012

(30) Foreign Application Priority Data

Jan. 28, 2011 (JP) ................................. 2011-016610

(51) Int. Cl.
*B60R 21/207* (2006.01)

(52) U.S. Cl.
USPC ................... 280/730.1; 280/728.2; 297/216.1

(58) Field of Classification Search
USPC ............. 280/728.2, 730.1, 730.2; 297/216.1, 297/216.16, 216.19
See application file for complete search history.

(56) References Cited

U.S. PATENT DOCUMENTS

| 6,935,684 B2* | 8/2005 | Sakai ......................... 297/216.1 |
| 7,607,728 B2* | 10/2009 | Hiruta et al. ............... 297/216.1 |
| 7,878,589 B2* | 2/2011 | Murakami et al. ....... 297/284.11 |
| 2007/0132214 A1* | 6/2007 | Suzuki et al. .............. 280/730.1 |
| 2010/0045003 A1* | 2/2010 | Mills .......................... 280/728.2 |

FOREIGN PATENT DOCUMENTS

JP 06227344 A * 8/1994
JP A-2007-238016 9/2007

* cited by examiner

*Primary Examiner* — Joseph Rocca
*Assistant Examiner* — Darlene P Condra
(74) *Attorney, Agent, or Firm* — Posz Law Group, PLC

(57) ABSTRACT

A seat cushion airbag apparatus is applied to a vehicle seat having a seat portion. The seat portion has a seat cushion that is supported from below by a support portion of a seat frame. The apparatus raises a seat face of the vehicle seat, thereby restraining an object on the seat face to prevent the object from moving forward. The apparatus includes an airbag, an inflation fluid generator, and a contact preventing member. The airbag is arranged between the support portion and the cushion. The inflation fluid generator supplies inflation fluid for inflating the airbag, thereby raising the seat face. The contact preventing member is arranged between the support portion and the airbag. A part of the contact preventing member that is in the vicinity of the support portion is flexible. The contact preventing member prevents the airbag from contacting the support portion when the airbag is inflated.

7 Claims, 12 Drawing Sheets

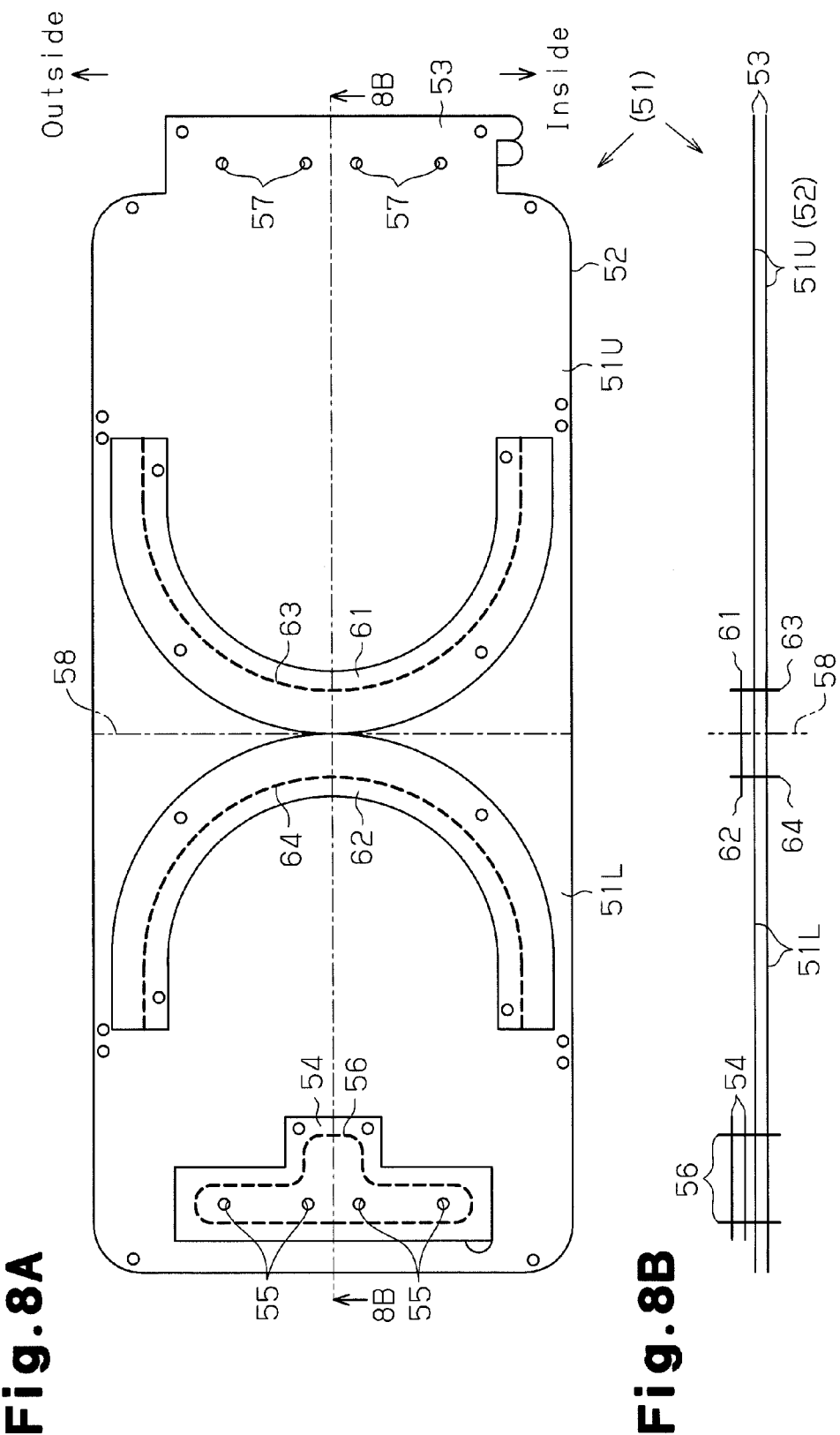

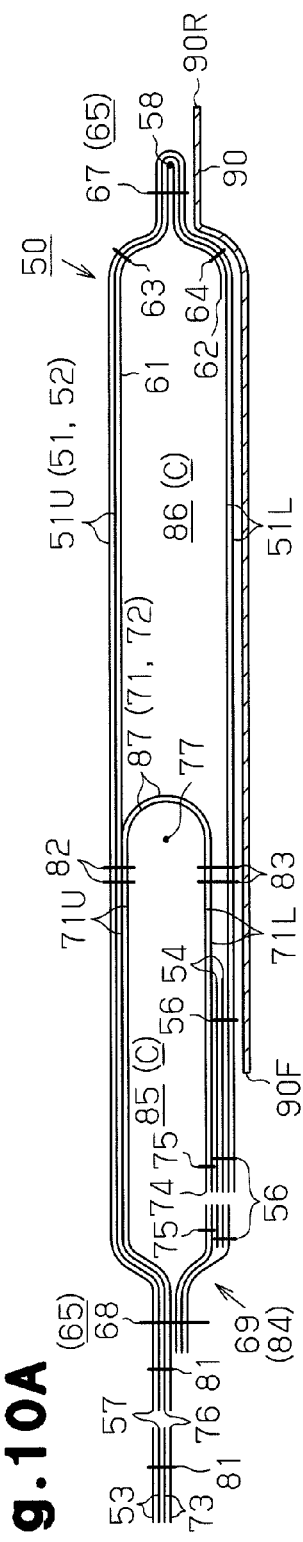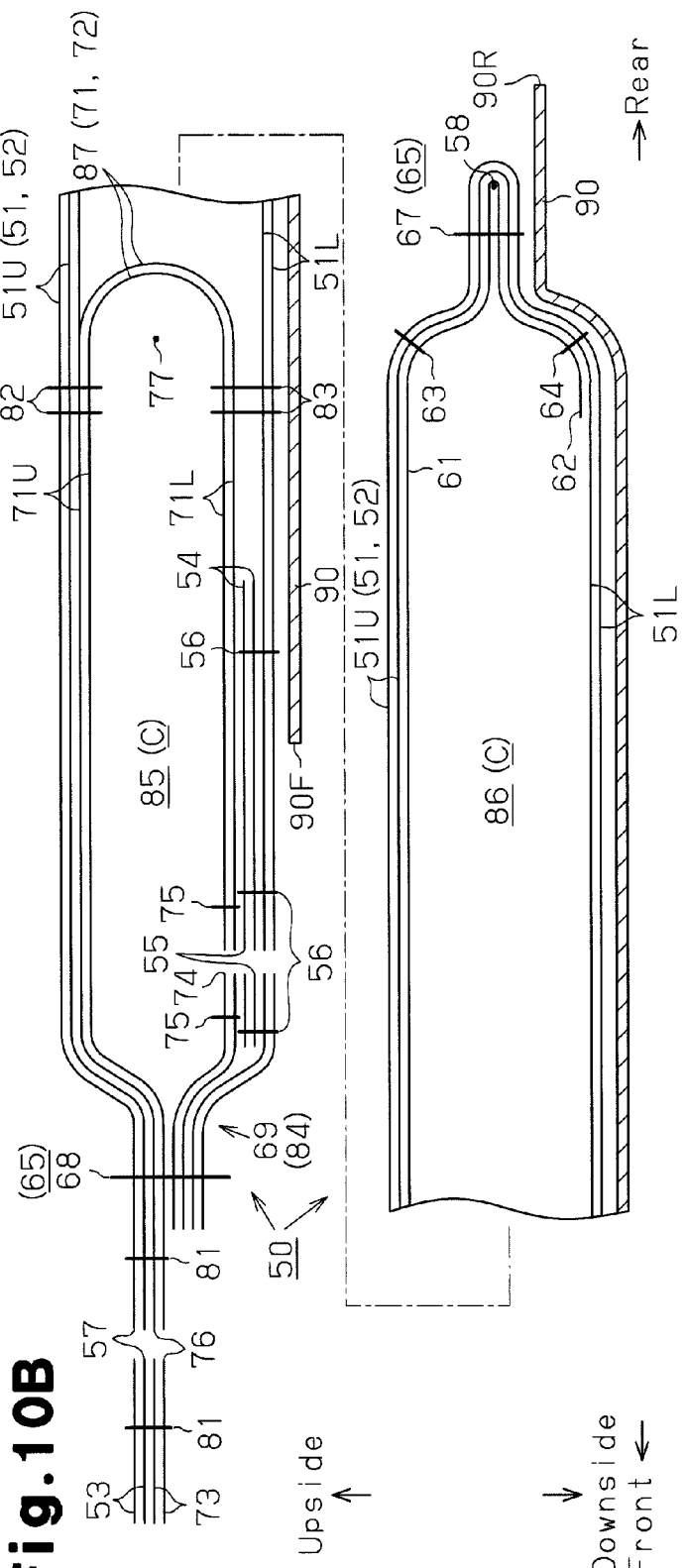

SEAT CUSHION AIRBAG APPARATUS

BACKGROUND OF THE INVENTION

The present invention relates to a seat cushion airbag apparatus that inflates an airbag installed in a seat portion of a vehicle seat with inflation fluid such as inflation gas, thereby raising the seat face to restrain an object to be restrained such as an occupant seated in the seat portion against forward movement.

When an impact due to a front collision is applied to a vehicle from the front, the lumbar region of an occupant restrained to a vehicle seat by a seat belt device may be disengaged from the lap belt portion and move forward. This is known as a "submarine phenomenon." Various measures against the submarine phenomenon have been proposed.

For example, Japanese Laid-Open Patent Publication No. 2007-238016 discloses a seat cushion airbag apparatus applied to a vehicle seat having a seat portion. The seat portion is structured such that a seat cushion is supported from below by a support portion of a seat frame. The support portion includes spring members for elastically supporting the seat cushion from below and hooks for securing the spring members.

The seat cushion airbag apparatus has an accommodation case (base) having an upper opening. The accommodation case is located forward of the support portion of the seat frame. The accommodation case accommodates an inflation fluid generator (inflator) arranged therein. An airbag is also arranged in the accommodation case. The airbag is inflated with inflation fluid (high-pressure gas) supplied by the inflation fluid generator. Further, a contact preventing member is rotationally supported at the upper end of the accommodation case. The contact preventing member closes the upper opening of the accommodation case when no impact is applied from the front of the vehicle and the seat cushion airbag apparatus is not activated.

According to the above seat cushion airbag apparatus, when an impact is applied from the front of the vehicle, the inflation fluid generator supplies inflation fluid to the airbag, so that the airbag is deployed and inflated while being unfolded. The airbag, which is being deployed and inflated upward, raises the contact preventing member. This rotates the contact preventing member rearward to be overlapped with a front portion of the support portion. The airbag is deployed and inflated rearward in a space between the seat cushion and the set of the contact preventing member and the support portion. The airbag thus pushes up the seat cushion so that the seat face is raised to restrain the occupant in the seat against forward movement. At this time, the contact preventing member prevents the airbag and the support portion of the seat frame from contacting each other so that the airbag is not damaged by contact with the support portion.

SUMMARY OF THE INVENTION

However, since the contact preventing member in Japanese Laid-Open Patent Publication No. 2007-238016 is located in the seat frame, it needs to be arranged taking into consideration the length of the airbag when deployed. The contact preventing member needs to be arranged such that during the period in which the airbag, which has been folded and accommodated, is being inflated while being deployed, the airbag never contacts the support portion. This makes the design of the contact preventing member difficult. This drawback is particularly notable in a case where an airbag is deployed to a position that is rearward of and farther from the accommodation case. In other words, this drawback is particularly notable in a case where an airbag is long in the front-rear direction and has a large volume. The contact preventing member needs to rotate between the support portion and the seat cushion, and its size is limited. Thus, the longer the airbag is in the front-rear direction and the greater the volume of the airbag, the more difficult the design of the contact preventing member becomes.

Accordingly, it is an objective of the present invention to provide a seat cushion airbag apparatus that is capable of preventing an airbag from contacting a support portion of a seat frame with a simple design.

To achieve the foregoing objective, and in accordance with one aspect of the present invention, a seat cushion airbag apparatus is provided that is applied to a vehicle seat having a seat portion. The seat portion has a seat cushion that is supported from below by a support portion of a seat frame. The seat cushion airbag apparatus raises a seat face of the vehicle seat, thereby restraining an object on the seat face so that the object is prevented from moving forward. The seat cushion airbag apparatus includes an airbag, an inflation fluid generator, and a contact preventing member. The airbag is arranged between the support portion of the seat frame and the seat cushion. The inflation fluid generator supplies inflation fluid for inflating at least a part of the airbag between the support portion of the seat frame and the seat cushion, thereby raising the seat face. The contact preventing member is arranged between the support portion of the seat frame and the airbag. A part of the contact preventing member that is in the vicinity of the support portion is flexible. The contact preventing member prevents the airbag from contacting the support portion of the seat frame when the airbag is inflated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8A is a plan view showing an airbag body in a flatly deployed state;

FIG. 8B is a cross-sectional view taken along line 8B-8B in FIG. 8A;

FIG. 10A is a cross-sectional view taken along line 10A-10A in FIG. 5;

FIG. 10B is an enlarged cross-sectional view illustrating a part of FIG. 10A;

DETAILED DESCRIPTION OF THE PREFERRED EMBODIMENTS

One embodiment of the present invention will now be described with reference to the drawings.

In the following, the traveling direction of the vehicle is defined as a forward direction. The backward, upward, downward, leftward, and rightward directions are defined with reference to the forward direction. Also, in each of the drawings, "inside" represents inner side of the vehicle, and "outside" represents the outer side of the vehicle.

First, a vehicle seat to which a seat cushion airbag apparatus of the present embodiment is applied will be schematically described.

Figure 1:
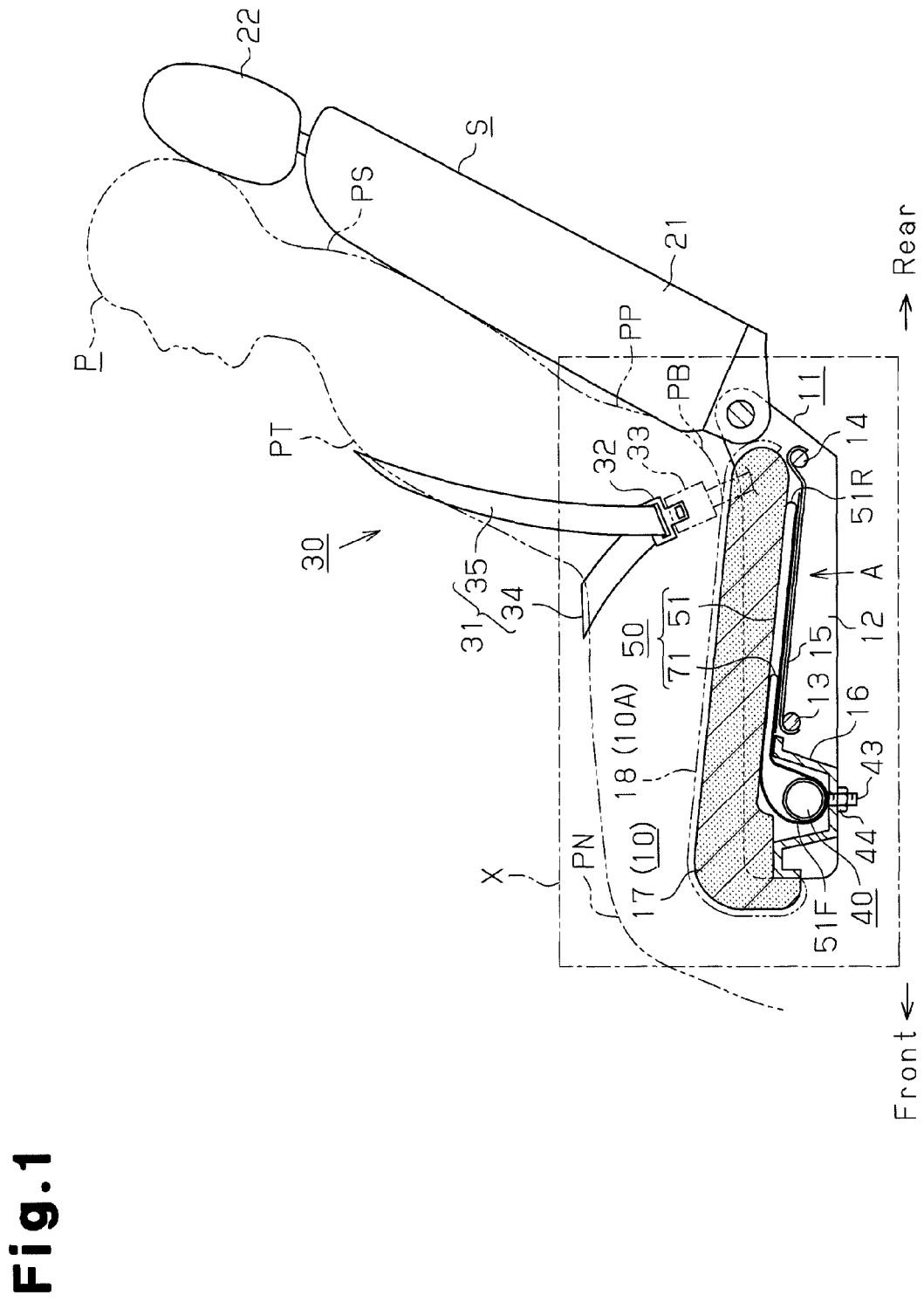
FIG. 1 is a cross-sectional view illustrating, together with an occupant and a seat belt device, a vehicle seat to which a seat cushion airbag apparatus according to one embodiment of the present invention is applied.
Figure 2:
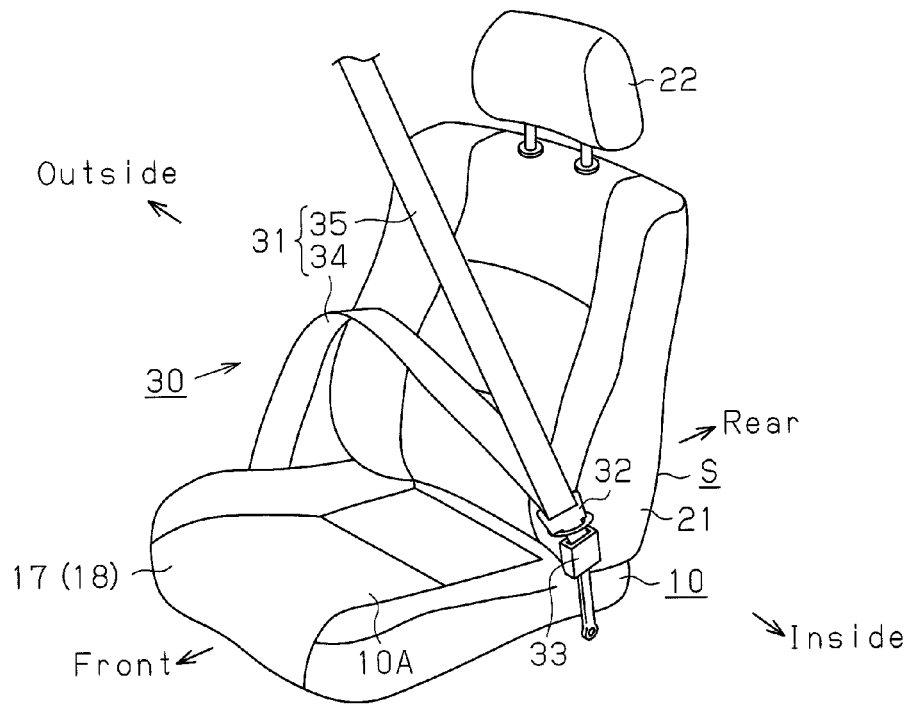
FIG. 2 is a perspective view illustrating a part of the vehicle seat and the seat belt device.

As shown in FIGS. 1 and 2, a vehicle seat S has a seat portion (seat cushion) 10, a backrest (seat back) 21, the inclination of which is adjustable, arranged at the rear end of the seat portion 10, and a headrest 22, which is arranged on top of the backrest 21.

Figure 3:
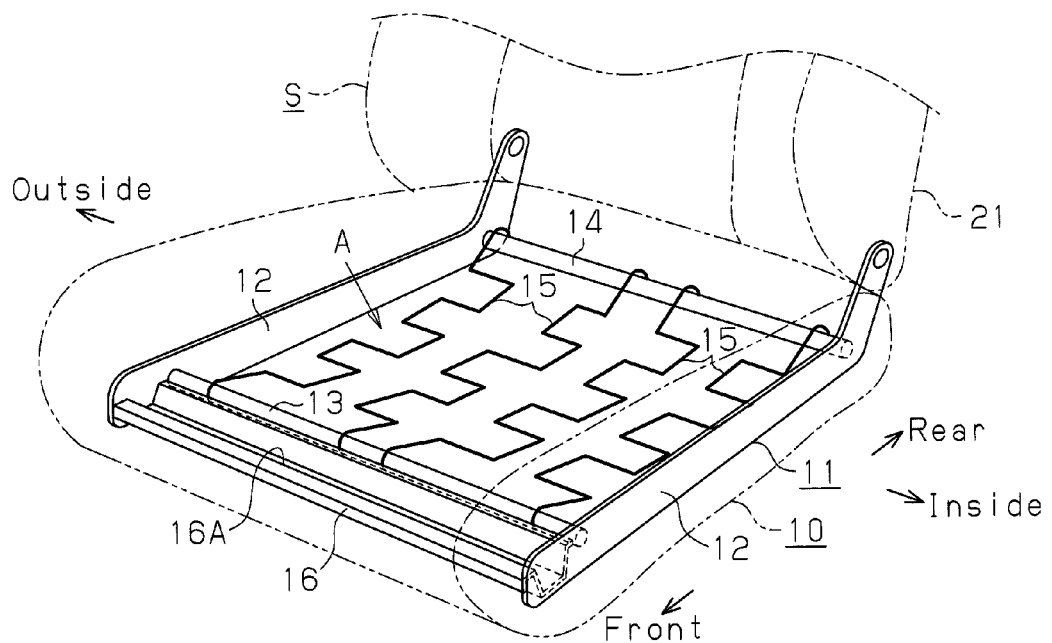
FIG. 3 is a partial perspective view showing a seat frame and an accommodation case in the vehicle seat.

The seat portion 10 is a part in which an occupant P, or an object to be restrained by the seat cushion airbag apparatus, is seated. As shown in FIG. 3, a seat frame 11, which forms a framework of the seat portion 10, includes left and right side frame portions 12, front and rear coupling frame portions 13, 14, multiple wire frame portions 15, and an accommodation case 16. The side frame portions 12 are shaped as plates extending in the front-rear direction and separated from each other in the vehicle widthwise direction (left-right direction). The coupling frame portions 13, 14 are each formed by a rod extending in the vehicle widthwise direction and arranged between the side frame portions 12. The coupling frame portions 13, 14 are separated from each other in the front-rear direction. The wire frame portions 15 are each formed into a series of S-shaped sections. The wire frame portions 15 function as tension springs for improving sitting comfort. The wire frame portions 15 are separated from one anther in the vehicle widthwise direction and extend between the front and rear coupling frame portions 13, 14. Specifically, the coupling frame portions 13, 14 have engaging claws (not shown) to which the wire frame portions 15 are hooked and secured. The wire frame portions 15 and the engaging claws form a support portion A, which supports a seat cushion 17, which will be discussed, from below.

The accommodation case 16 is arranged adjacent to the front end of the coupling frame portion 13 and extends in the vehicle widthwise direction. The accommodation case 16 has an accommodation recess 16A, which extends in the vehicle widthwise direction and opens upward. A front portion of an airbag module AM is accommodated in the accommodation recess 16A. The ends of the accommodation case 16 are fixed to the left and right side frame portions 12.

Figure 4:
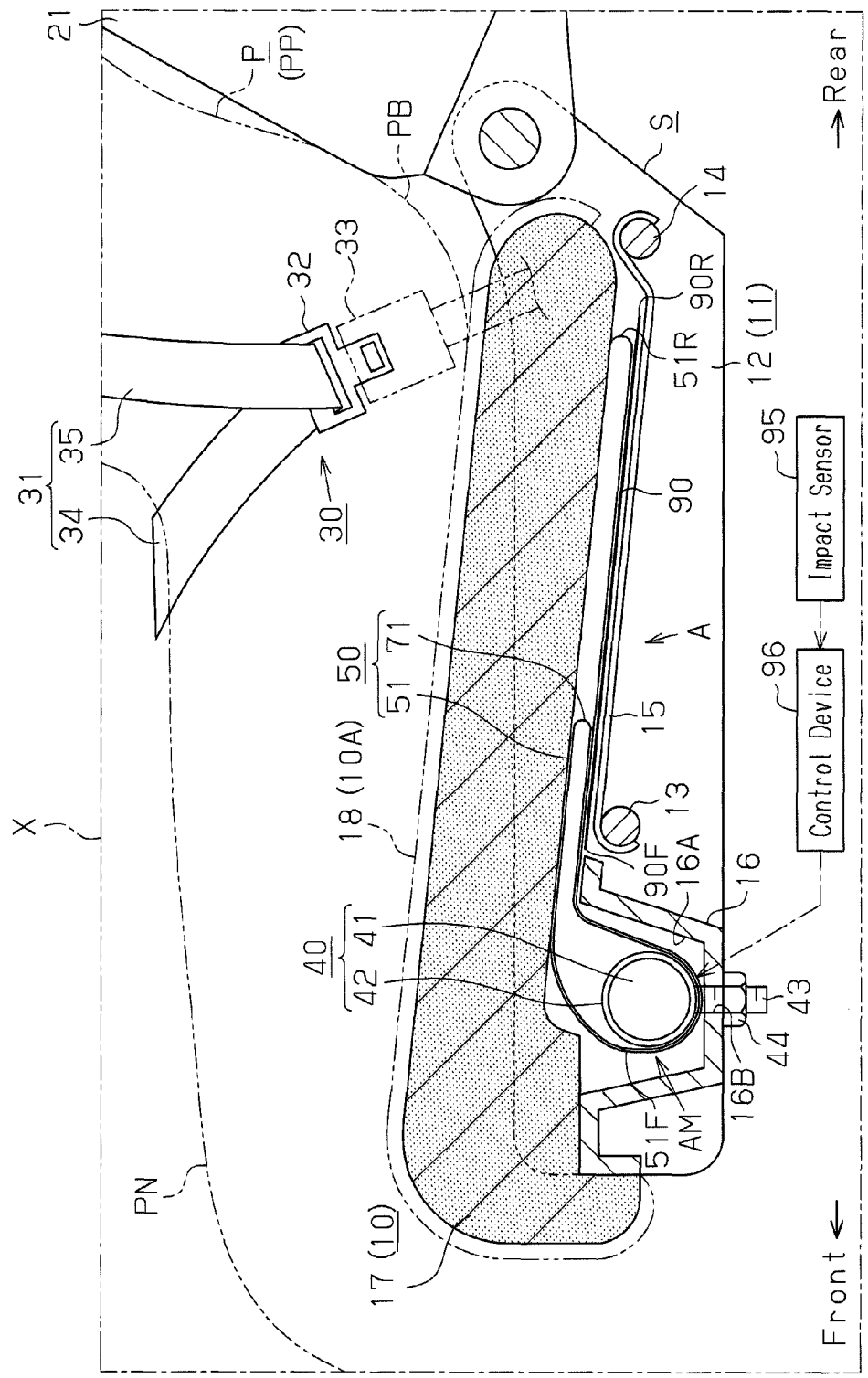
FIG. 4 is an enlarged partial cross-sectional view illustrating section X in FIG. 1.

As shown in FIG. 4, a seat cushion 17 is arranged on the seat frame 11. The seat cushion 17 is covered with a cover 18, which is made of fabric or leather, and forms a seat face 10A.

The vehicle is equipped with a seat belt device 30 for restraining an occupant P seated in the vehicle seat S.

As shown in FIGS. 1 and 2, the seat belt device 30 has belt-like webbing 31, a tongue 32, and a buckle 33. The webbing 31 restrains the occupant P. The tongue 32 is attached to the webbing 31 to be movable along the longitudinal direction of the webbing 31. The buckle 33 is on the inner side of the vehicle seat portion 10 to be detachably connected to the tongue 32. One end of the webbing 31 is fixed to the outer side of the seat portion 10, and the other end of the webbing 31 is reeled in by a seat belt retractor (not shown) arranged at the outer side. The tongue 32 is slid relative to the webbing 31, so as to change the lengths of a lap belt portion 34 and a shoulder belt portion 35 of the seat belt device 30.

The lap belt portion 34 refers to a section of the webbing 31 that extends from the tongue 32 to an end (the fixed end) of the webbing 31. The lap belt portion 34 extends from one side of the lumbar region PP of the seated occupant P to the other side via the front side of the lumbar region PP. The shoulder belt portion 35 refers to a section of the webbing 31 that extends from the tongue 32 to the seat belt retractor. The shoulder belt portion 35 extends diagonally from a shoulder PS of the seated occupant P to a side of the lumbar region PP via the front side of the thorax PT.

The vehicle is equipped with a seat cushion airbag apparatus (hereinafter, simply referred to as an airbag apparatus), which suppresses the submarine phenomenon. The submarine phenomenon refers to a phenomenon in which, when an impact due to a front collision is applied to a vehicle from the front, the lumbar region PP of the occupant P restrained to the vehicle seat S by the seat belt device 30 may be disengaged from the lap belt portion 34 and move forward.

FIG. 4 is a schematic view showing the airbag apparatus. As shown in FIG. 4, the airbag apparatus includes the airbag module AM, an impact sensor 95, and a control device 96. The airbag module AM includes an inflator assembly 40, an airbag 50, and a contact preventing member 90. The contact preventing member 90 prevents the airbag 50 from contacting the support portion A of the vehicle seat S. Hereinafter, components of the airbag module AM will be described with reference to FIGS. 5 to 13.

<Structure of Inflator Assembly 40>

Figure 6:
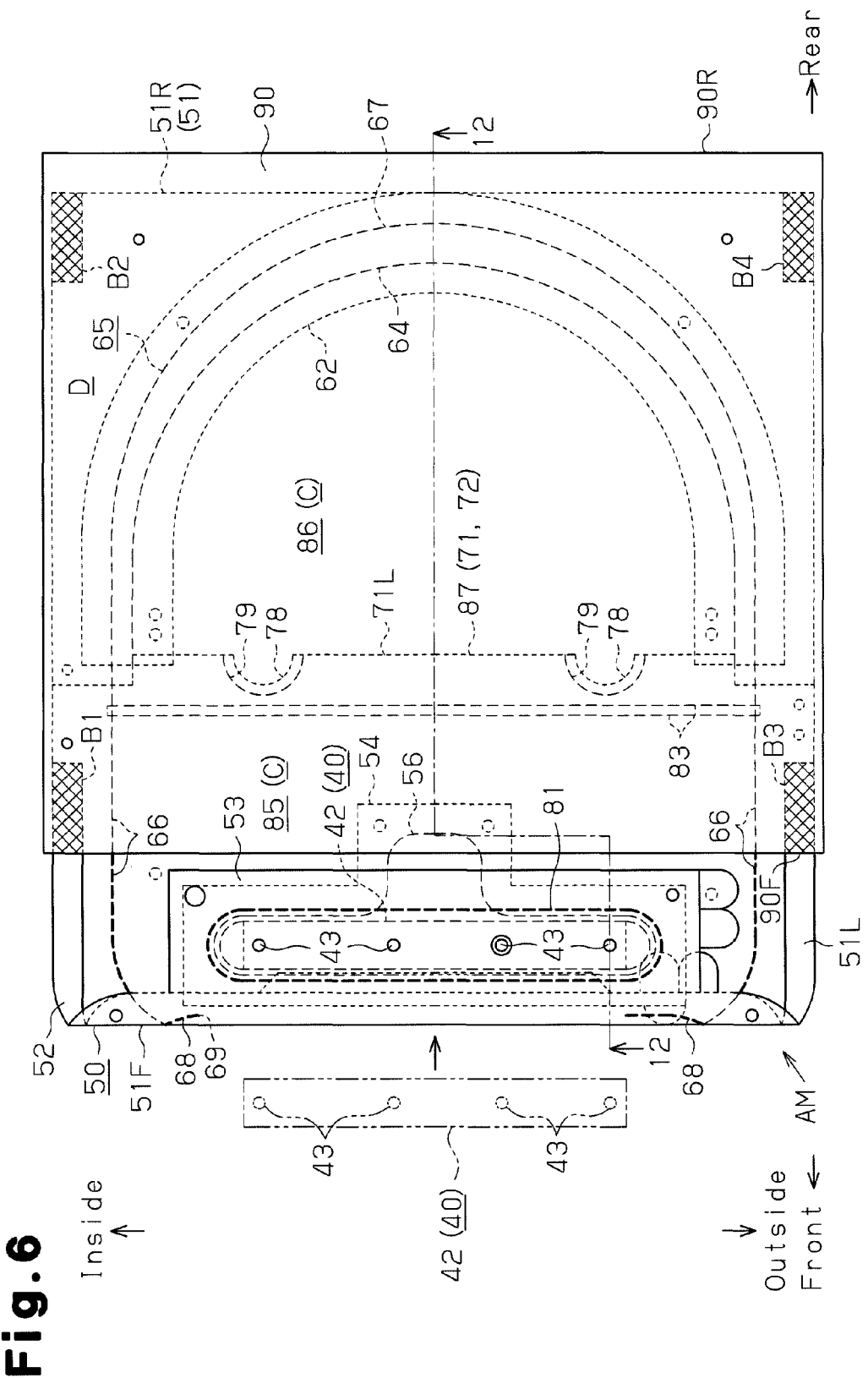
FIG. 6 is a bottom view illustrating the airbag module in which the inflator assembly is incorporated.
Figure 13:
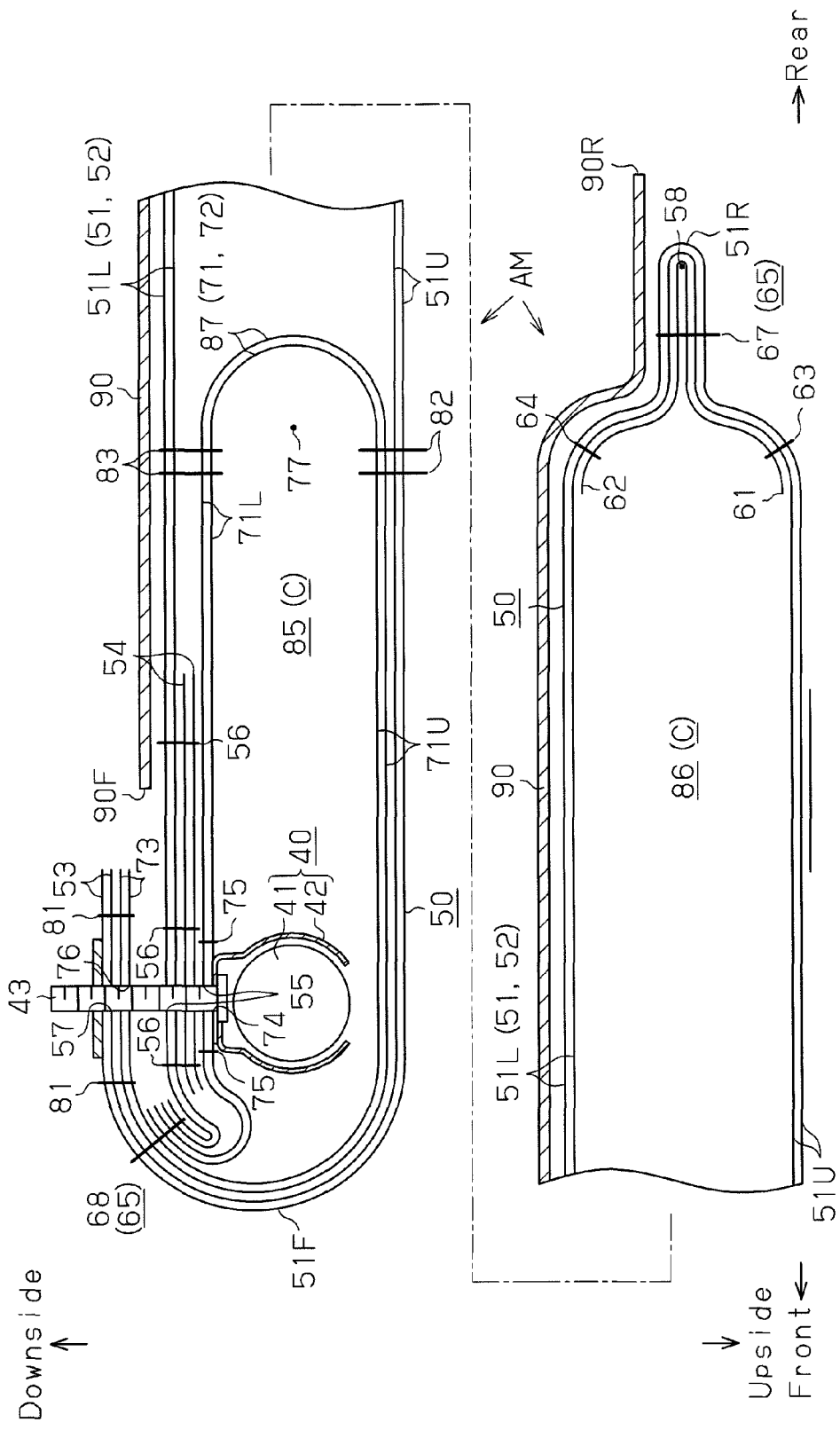
FIG. 13 is a partially enlarged cross-sectional view of FIG. 12.

As shown in FIGS. 6 and 13, the inflator assembly 40 includes an inflator 41 for generating inflation fluid and a retainer 42 that surrounds the inflator 41. The inflator 41 is substantially cylindrical and accommodates a gas generating agent (not shown). This type of inflator 41 (called a pyrotechnic type inflator) is capable of generating inflation gas through chemical reaction accompanied by heat generation by a gas generating agent. The inflator 41 has gas outlets (not shown) through which generated gas is jetted out. A harness (not shown), which is wiring for transmitting control signals to the inflator 41, is connected to one end of the inflator 41.

Alternatively, an inflator other than the pyrotechnic type may be used. Examples of alternative inflators include a stored gas type, which breaks a partition wall of a high-pressure gas cylinder filled with a high-pressure gas by a low explosive so as to release the gas, and a hybrid type, in which the pyrotechnic type and stored gas type are combined.

Most part of the retainer 42 is substantially cylindrical and is formed by bending a plate such as a metal plate to extend in the vehicle widthwise direction (the up-down direction in FIG. 6). A plurality of downward extending bolts 43 are fixed to the lower surface of the retainer 42. The bolts 43 are separated from one another in the vehicle widthwise direction.

The inflator 41 may be integrally formed with the retainer 42.

<Structure of Airbag 50>

Figure 12:
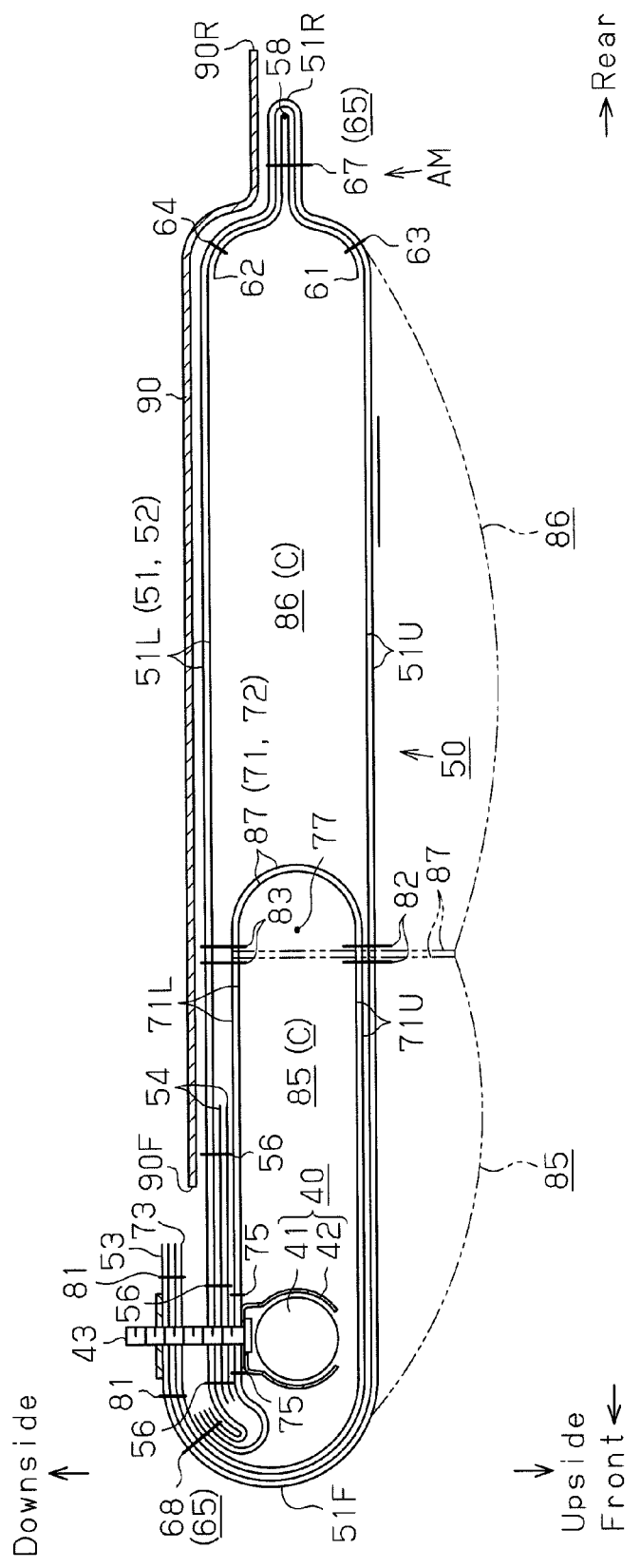
FIG. 12 is a cross-sectional view taken along line 12-12 of FIG. 6.

As shown in FIGS. 4 and 12, the airbag 50 includes an airbag body 51 and an inner bag 71. The airbag body 51 forms the outer shell of the airbag 50 and is inflated to raise the seat face 10A of the seat portion 10. The airbag 50 envelops the inflator assembly 40 and is arranged in the airbag body 51.

<Structure of Airbag Body 51>

As shown in FIGS. 8A and 8B, most of the airbag body 51 is formed by substantially rectangular fabric sheets (hereinafter, referred to as base fabric sheets 52) that have an elongated shape. In the present embodiment, two base fabric sheets 52 are used. However, a different number of base fabric sheets 52 may be employed. Each base fabric sheet 52 is formed of woven fabric formed by polyester threads or polyamide threads. The base fabric sheets 52 thus have a high stiffness and flexibility. An integrally formed wrap portion 53 is provided at a first end of each base fabric sheet 52. Since the wrap portion 53 is located at the first end of the base fabric sheets 52, the shape of the base fabric sheets 52 is asymmetrical in the longitudinal direction.

Long and thin reinforcing fabric sheets 54 extending in the vehicle width direction (the up-down direction in FIG. 8A) are stacked on a second end of the upper one of the base fabric sheets 52. The reinforcing fabric sheets 54 increase the strength of the second end of the base fabric sheets 52. In the present embodiment, two reinforcing fabric sheets 54 are used. However, a different number of reinforcing fabric sheets 54 may be employed. The base fabric sheets 52 and the reinforcing fabric sheets 54 have plurality of insertion holes 55, which are separated from one another in the vehicle widthwise direction. The bolts 43 of the retainer 42 are inserted through the insertion holes 55.

The reinforcing fabric sheets 54 and the base fabric sheets 52 have an endless joint portion 56 that surrounds all the insertion holes 55 without a break. The endless joint portion 56 serves to joint the reinforcing fabric sheets 54 and the base fabric sheets 52 together, and reinforces the surroundings of the insertion holes 55, thereby preventing the surroundings of the insertion holes 55 from being torn. The endless joint portion 56 is formed by sewing the reinforcing fabric sheets 54 to the base fabric sheets 52.

Other joint portions, such as an upper arcuate joint portion 63, a lower arcuate joint portion 64, a peripheral joint portion 65, a loop-like joint portions 75, 81, an annular joint portion 79, an upper inner joint portion 82, and a lower inner joint portion 83 are joined by sewing with sewing threads as in the case of the endless joint portion 56. Also, the loop-like joint portions 75, 81 and the annular joint portion 79 have the same function as the endless joint portion 56.

In the present embodiment, the above listed joint portions (the endless joint portion 56, the upper arcuate joint portion 63, the lower arcuate joint portion 64, the peripheral joint portion 65, the loop-like joint portions 75, 81, the annular joint portion 79, the upper inner joint portion 82, and the lower inner joint portion 83) are indicated by thick broken lines, which are distinguished from the normal broken lines (refer to FIG. 8A).

The wrap portions 53 of the base fabric sheets 52 have through holes 57 for receiving the bolts 43 at positions that are aligned with the insertion holes 55 when the wrap portions 53 are wrapped.

A folding line 58, which extends in the vehicle widthwise direction (the up-down direction as viewed in FIG. 8), is set in a center in the longitudinal direction of the base fabric sheets 52. The base fabric sheets 52 are folded along the folding line 58 to be stacked onto each other with respect to the up-down direction. In the base fabric sheets 52, parts closer to the first end with respect to the folding line 58 are referred to as upper fabric portions 51U, and parts closer to the second end with respect to the folding line 58 are referred to as lower fabric portions 51L.

An arcuate upper reinforcing fabric sheet 61, which protrudes toward the folding line 58, is stacked onto a part in the upper fabric portions 51U that is close to the folding line 58. An arcuate lower reinforcing fabric sheet 62, which protrudes toward the folding line 58, is stacked onto a part in the lower fabric portions 51L that is aligned with the upper reinforcing fabric sheet 61 when the lower fabric portions 51L is folded along the folding line 58. Although one upper reinforcing fabric sheet 61 and one lower reinforcing fabric sheet 62 are used in the present embodiment, two or more upper reinforcing fabric sheets 61 and two or more lower reinforcing fabric sheets 62 may be used. The upper reinforcing fabric sheet 61 is joined to the upper fabric portions 51U by the upper arcuate joint portion 63 extending along the upper reinforcing fabric sheet 61. Also, the lower reinforcing fabric sheet 62 is joined to the lower fabric portions 51L by the lower arcuate joint portion 64 extending along the lower reinforcing fabric sheet 62.

As shown in FIGS. 5, 7, 11 and 12, the base fabric sheets 52 are folded along the folding line 58. The upper fabric portions 51U and the lower fabric portions 51L, which are stacked onto each other in the up-down direction, are joined to each other at the peripheral joint portion 65. The peripheral joint portion 65 includes a pair of first peripheral joint portions 66, a second peripheral joint portion 67, and a pair of third peripheral joint portions 68.

The pair of first peripheral joint portions 66 are separated from each other in the vehicle widthwise direction (the up-down direction as viewed in FIGS. 5 and 7) and extend in the front-rear direction. The second peripheral joint portion 67 arcuately protrudes rearward along the upper arcuate joint portion 63 and the lower arcuate joint portion 64. The second peripheral joint portion 67 integrally joins the upper fabric portions 51U, the upper reinforcing fabric sheet 61, the lower reinforcing fabric sheet 62, and the lower fabric portions 51L, which are stacked in the order from the top to the bottom. The ends of the second peripheral joint portion 67 are connected to the rear ends of the first peripheral joint portions 66.

Alternatively, the second peripheral joint portion 67 may be formed to be straight, rather than arcuate. In the present embodiment, since the lower fabric portions 51L and the upper fabric portions 51U are connected and integrated with each other at the folding line 58, the second peripheral joint portion 67 may be omitted.

The third peripheral joint portions 68 extend forward from the front ends of the first peripheral joint portions 66 and are curved toward each other.

Figure 7:
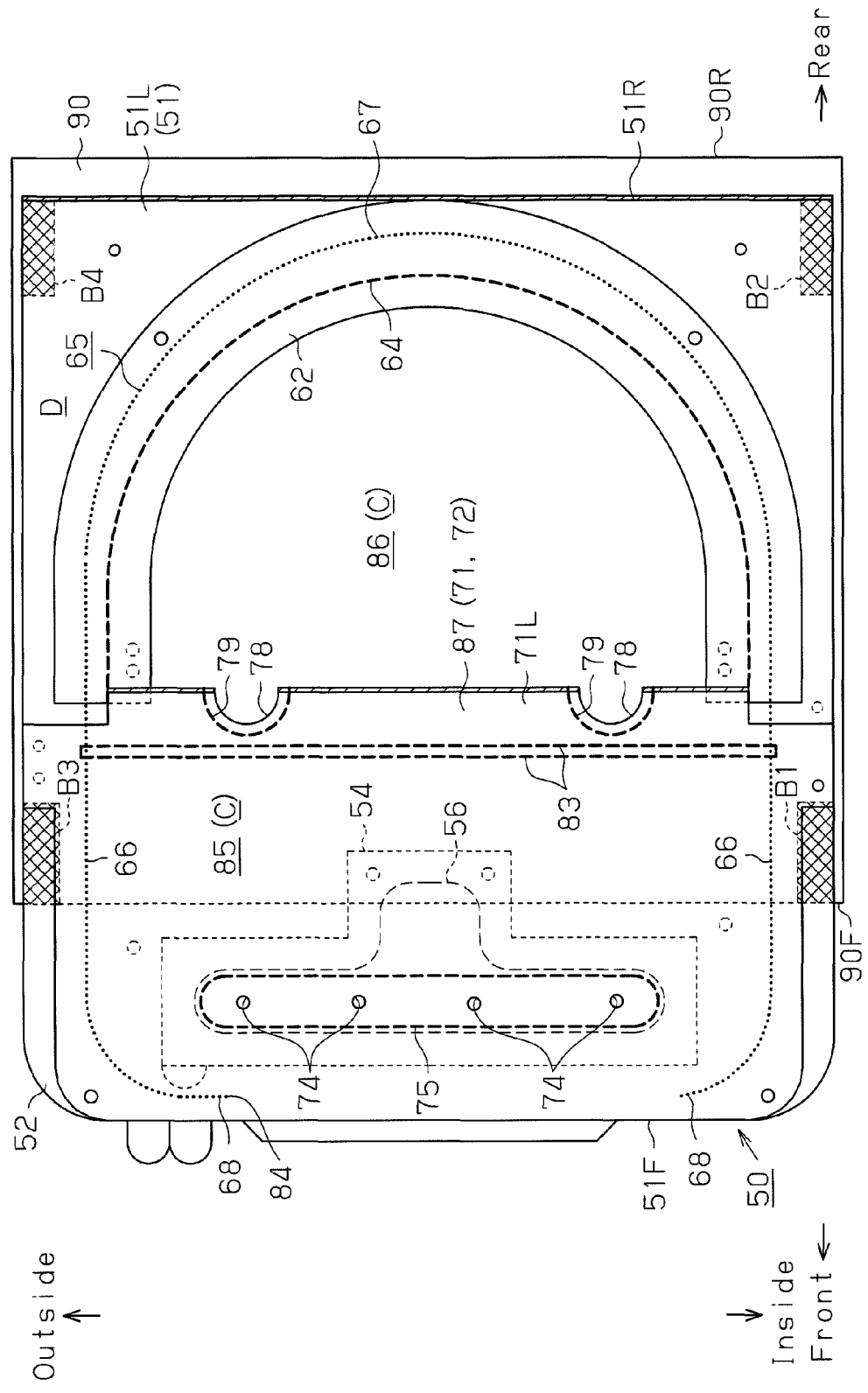
FIG. 7 is a cross-sectional plan view of the airbag shown in FIG. 5.

In the present embodiment, the sawing thread of the peripheral joint portion 65 is expressed by dotted line in a cross-section that lies in the peripheral joint portion 65 between the upper reinforcing fabric sheet 61 and the lower reinforcing fabric sheet 62 (see FIG. 7).

The airbag body 51 is formed by joining the upper fabric portions 51U and the lower fabric portions 51L to each other at the peripheral joint portion 65 as described above. The front ends of the upper fabric portions 51U and the lower fabric portions 51L are not joined by the peripheral joint portion 65 and form an opening 69. The opening 69 is sandwiched by the third peripheral joint portions 68 between the upper fabric portions 51U and the lower fabric portions 51L (see FIG. 5). The opening 69 is used for connecting the harness of the inflator assembly 40, which is arranged in a front portion of the airbag body 51, to the outside of the airbag body 51.

As shown in FIG. 4, the airbag body 51 is arranged between the seat cushion 17 and the seat frame 11 in a flatly deployed state. A front end 51F of the airbag body 51 is located below a front portion of the seat portion 10 (the knees PN of the occupant P). The arrangement is the same as that of the airbag body in a common seat cushion airbag apparatus. In a common seat cushion airbag apparatus, the rear end of the airbag body corresponds to a center portion in the front-rear direction of the seat portion 10. In contrast, a rear end 51R of the airbag body 51 of the present embodiment is located below a rear portion of the seat portion 10 (the buttocks PB of the occupant P). Since the rear end 51R is located in a rear portion of the seat portion 10, the airbag body 51, or the airbag 50, has an extended dimension along the front-rear direction and a large volume.

<Structure of Inner Bag 71>

Figure 9A:
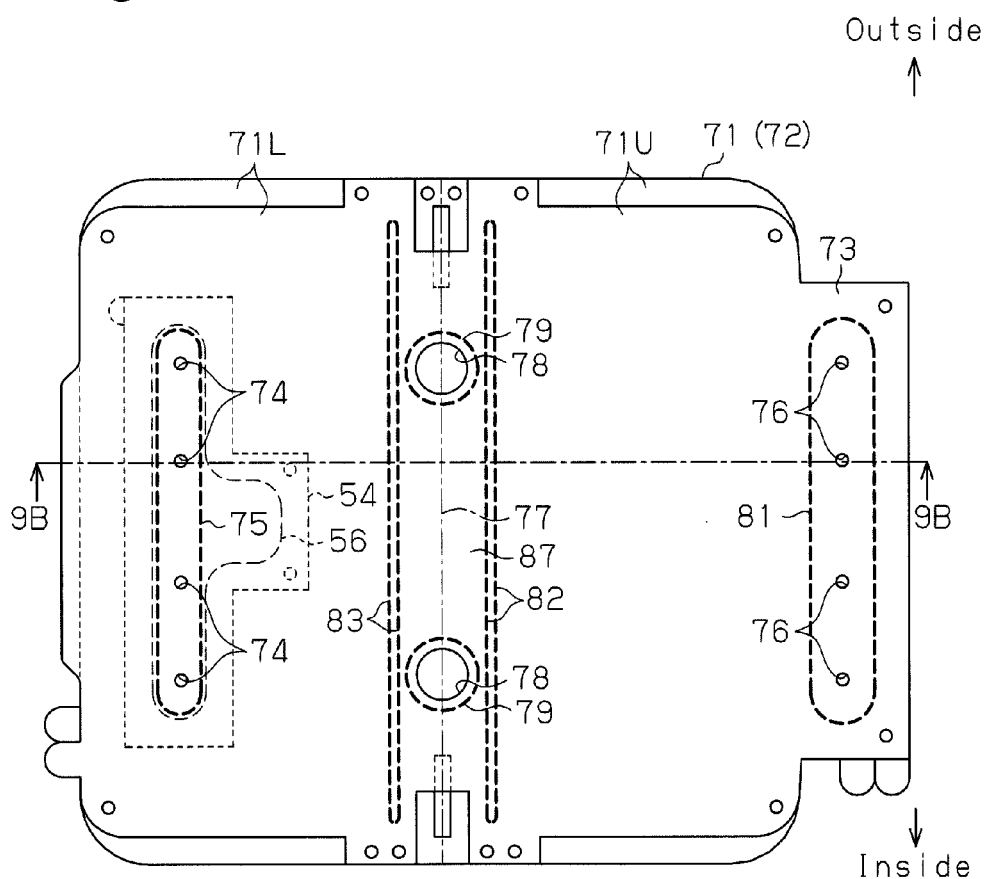
FIG. 9A is a plan view showing an inner bag in a flatly deployed state joined to the airbag body.
Figure 9B:
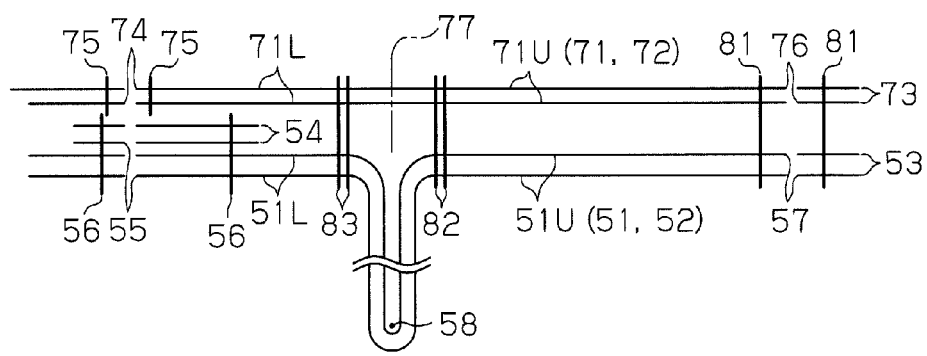
FIG. 9B is a cross-sectional view taken along line 9B-9B in FIG. 9A.

As shown in FIGS. 9A and 9B, most of the inner bag 71 is formed by substantially rectangular fabric sheets (hereinafter, referred to as base fabric sheets 72). In the present embodiment, two base fabric sheets 72 are used. However, a different number of base fabric sheets 72 may be employed. The base fabric sheets 72 are formed of the same woven fabric as that of the airbag body 51, and thus have a high stiffness and flexibility. An integrally formed wrap portion 73 is provided at the first end of each base fabric sheet 72, which correspond to the first end of the base fabric sheets 52 of the airbag body 51. The wrap portions 73 substantially have the same shape and dimension as those of the wrap portions 53 of the airbag body 51. Since the base fabric sheets 72 have the wrap portions 53, the shape of the base fabric sheets 72 is asymmetrical in the longitudinal direction.

The base fabric sheets 72 have at the second end a plurality of insertion holes 74, which are separated from one another in the vehicle widthwise direction (the up-down direction as viewed in FIG. 9A). The insertion holes 74 receive the bolts 43 of the retainer 42. The base fabric sheets 72 have the loop-like joint portions 75 that surround all the insertion holes 74.

The wrap portions 73 have a plurality of through holes 76, which are separated from each other in the vehicle widthwise direction. The through holes 76 receive the bolts 43. The distance between each adjacent pair of the insertion holes 74 and the distance between each adjacent pair of the through holes 76 are the same as the distance between each adjacent pair of the bolts 43.

A folding line 77, which extends in the vehicle widthwise direction, is set in a center in the longitudinal direction of the base fabric sheets 72. The base fabric sheets 72 are folded along the folding line 77 to be stacked onto each other with respect to the up-down direction. In the base fabric sheets 72, parts closer to the first end with respect to the folding line 77 are referred to as upper inner fabric portions 71U, and parts closer to the second end with respect to the folding line 77 are referred to as lower inner fabric portions 71L.

The inner bag 71 has discharge holes 78 located on the folding line 77. The discharge holes 78 connect the interior to the exterior of the inner bag 71 when it is folded along the folding line 77. The discharge holes 78 discharge inflation gas, which is jetted out from the inflator 41, in a predetermined direction (rearward) in a second chamber 86. In the present embodiment, a pair of the discharge holes 78 is provided. However, a different number of discharge holes 78 may be provided. The amount of inflation gas that passes through all the discharge holes 78 per unit time is set less than the amount of inflation gas discharged from the inflator 41 per unit time. The base fabric sheets 72 have annular joint portions 79, each of which surrounds one of the discharge holes 78.

<Installing Method of Inner Bag 71>

The wrap portions 73 of the inner bag 71 are stacked onto the wrap portions 53 of the airbag body 51 such that the through holes 76 are aligned with the through holes 57. The wrap portions 53 of the airbag body 51 and the wrap portions 73 of the inner bag 71 are joined together by the loop-like joint portion 81, which surrounds the through holes 57, 76.

The upper inner fabric portions 71U are joined to the upper fabric portions 51U by the upper inner joint portion 82, which is located slightly away from the folding line 77 and extends in the vehicle widthwise direction. The lower inner fabric portions 71L are joined to the lower fabric portions 51L by the lower inner joint portion 83, which is located slightly away from the folding line 77 and extends in the vehicle widthwise direction.

As described above, the base fabric sheets 52 of the airbag body 51 are folded along the folding line 58, so that the upper fabric portions 51U and the lower fabric portions 51L are stacked onto each other in the up-down direction. As the base fabric sheets 52 of the airbag body 51 are folded, the inner bag 71 is folded along the folding line 77 as shown in FIGS. 10A and 10B. Through the folding, the upper inner fabric portions 71U and the lower inner fabric portions 71L are stacked onto each other between the upper fabric portions 51U and the lower fabric portions 51L. In this state, the inner bag 71 is located forward of a center in the longitudinal direction of the airbag body 51.

Figure 5:
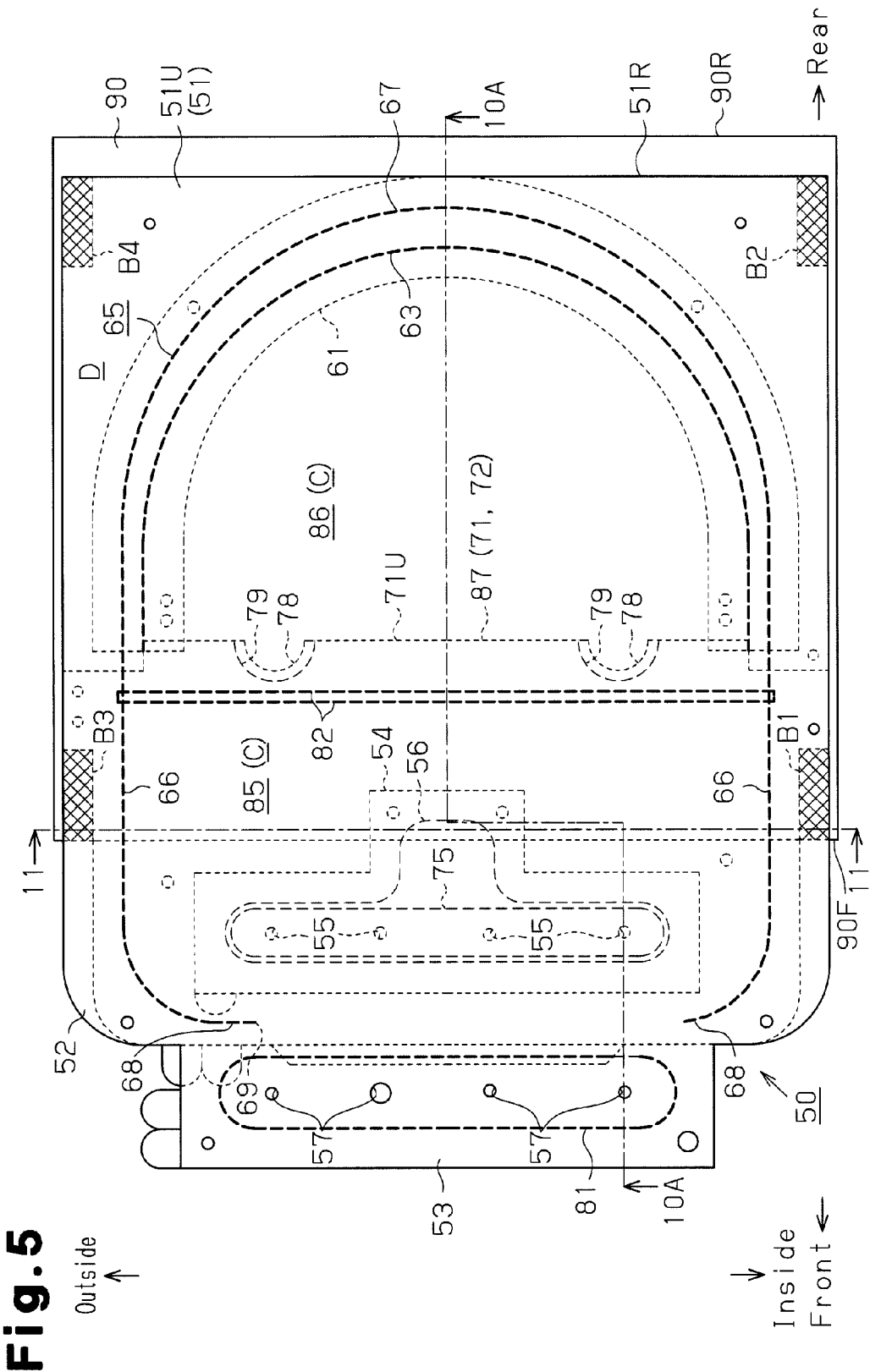
FIG. 5 is a plan view illustrating an airbag before an inflator assembly is incorporated therein.
Figure 11:
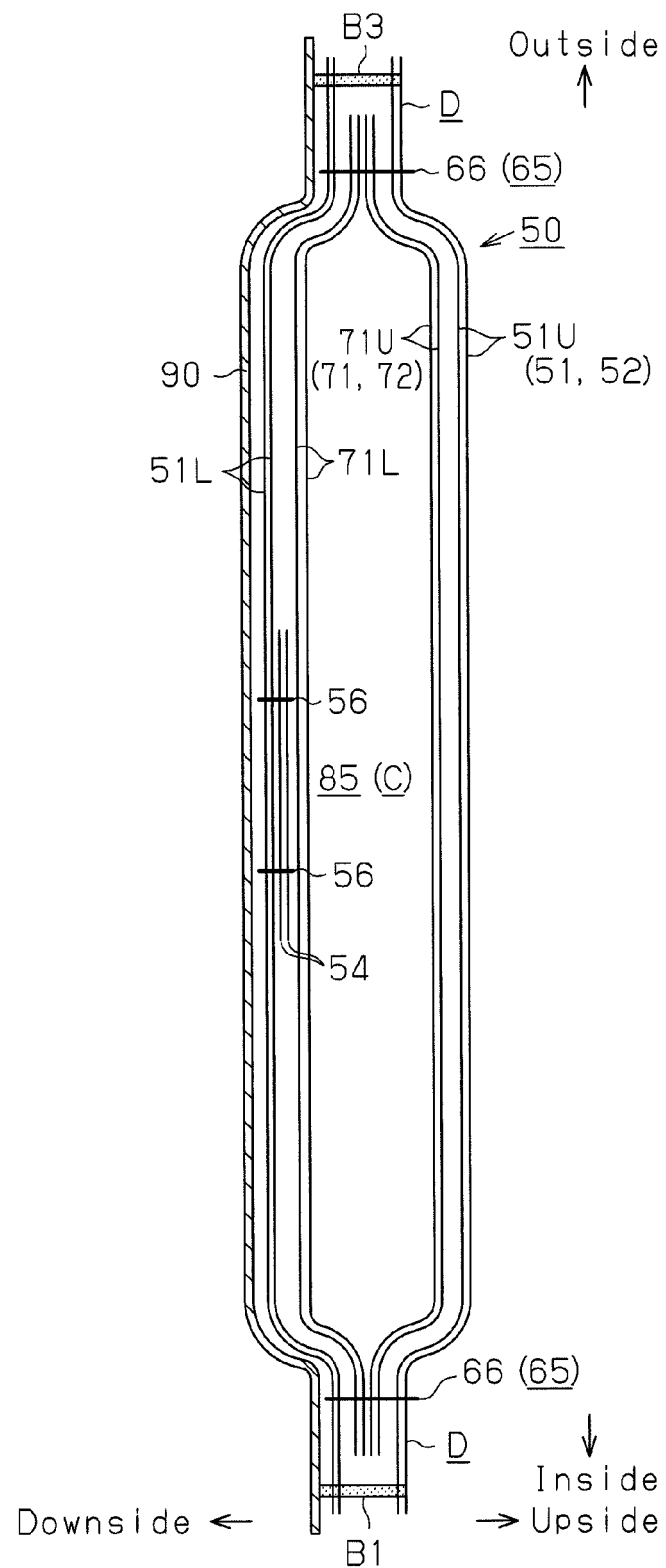
FIG. 11 is a cross-sectional view taken along line 11-11 of FIG. 5.

The upper inner fabric portions 71U and the lower inner fabric portions 71L are sewn to the upper fabric portions 51U and the lower fabric portions 51L by a part of the peripheral joint portion 65 as shown in FIGS. 5 and 11. More specifically, sides of the upper inner fabric portions 71U and the lower inner fabric portions 71L in the vehicle widthwise direction (the up-down direction as viewed in FIG. 5) are sewn to the upper fabric portions 51U and the lower fabric portions 51L by the first peripheral joint portions 66. Also, front corners of the upper inner fabric portions 71U and the lower inner fabric portions 71L are joined (sewn) to the upper fabric portions 51U and the lower fabric portions 51L by the third peripheral joint portions 68.

A part of the peripheral joint portion 65 (the first peripheral joint portions 66 and the third peripheral joint portions 68) that joins the upper fabric portions 51U and the lower fabric portions 51L of the airbag body 51 to each other as described above functions to join the sides of the inner bag 71 in the vehicle widthwise direction to the airbag body 51. In other words, a part of the peripheral joint portion 65 also functions as a joint portion that joins the sides of the inner bag 71 in the vehicle widthwise direction to the airbag body 51. Thus, when the upper fabric portions 51U and the lower fabric portions 51L are joined to each other, the sides of the inner bag 71 in the vehicle widthwise direction are joined together.

As shown in FIG. 7, a part in the inner bag 71 that is surrounded by the first peripheral joint portions 66 and the third peripheral joint portions 68 is inflated with inflation gas. The front ends of the upper inner fabric portions 71U and the lower inner fabric portions 71L are not joined by the peripheral joint portion 65 and form an opening 84. The opening 84 is sandwiched by the third peripheral joint portions 68 and is located between the upper inner fabric portions 71U and the lower inner fabric portions 71L. The opening 84 is used for connecting the harness of the inflator assembly 40, which is arranged in the inner bag 71, to the outside of the inner bag 71.

As described above, a part surrounded by the peripheral joint portion 65 forms an inflation portion C in the airbag 50, which is formed by joining the inner bag 71 to the airbag body 51. The inflation portion C is inflated with inflation gas supplied by the inflator 41. As shown in FIGS. 7 and 12, the inflation portion C is divided by a tether 87 of the inner bag 71 into a chamber for accommodating the inflator 41 (the first chamber 85) and a chamber that does not accommodate the inflator 41 (the second chamber 86). A part of the airbag 50 that is outside the peripheral joint portion 65 forms a non-inflation portion D, which is not supplied with inflation gas and is thus not inflated (refer to FIG. 11).

In the inner bag 71 of the airbag 50, a part between the upper inner joint portion 82 and the lower inner joint portion 83 in the up-down direction forms the tether 87, which limits the inflation thickness in the up-down direction of the airbag body 51. The position of the tether 87 in the front-rear direction is one of the factors that determine the volumes of the first chamber 85 and the second chamber 86. In the present embodiment, the position of the tether 87 is set such that the volume of the first chamber 85 is smaller than the volume of the second chamber 86. Such a position is forward of the center of the airbag body 51 in the front-rear direction.

<Structure of Contact Preventing Member 90>

As shown in FIGS. 4 and 6, the contact preventing member 90 prevents the airbag 50, which is made of fabric (the airbag body 51), from contacting the support portion A of the vehicle seat S. The contact preventing member 90 prevents the support portion A, particularly, pointed parts such as parts to which the engaging claws of the wire frame portions 15 are hooked, from contacting the airbag 50.

The contact preventing member 90 is formed of a single sheet. In the present embodiment, the contact preventing member 90 is formed by laminating felt onto a soft resin sheet made of a synthetic resin such as polyethylene. The felt is not formed by weaving or knitting fibers, but by causing fibers to tangle to form fabric, and has a high flexibility.

The contact preventing member 90 has a rectangular planar shape and substantially the same width as that of the airbag body 51 (in the present embodiment, slightly wider than the airbag body 51). A front end 90F of the contact preventing member 90 is arranged in a center portion of the inner bag 71 in the front-rear direction (in the vicinity of the upper rear end of the accommodation case 16). A rear end 90R of the contact preventing member 90 is arranged at a position slightly rearward of the rear end 51R of the airbag body 51.

The contact preventing member 90 is configured such that the felt forms the upper part (a part closer to the airbag 50) and the resin sheet forms the lower part (a part closer to the support portion A). The contact preventing member 90 is fixed to the lower surface of the lower fabric portions 51L of the airbag body 51. Specifically, the contact preventing member 90 is fixed to joint positions B1, B2, B3, and B4 on the non-inflation portion D.

The contact preventing member 90 is thermally welded to the airbag 50 at the joint positions B1 to B4. The contact preventing member 90 is stacked on the lower fabric portion 51L of the airbag body 51 at the joint positions B1 to B4. Then, the contact preventing member 90 is heated and pressed at positions corresponding to the joint positions B1 to B4, so that the contact preventing member 90 is partly melted and firmly secured to the lower fabric portion 51L.

<Mounting of Inflator Assembly 40 to Airbag 50>

The inflator assembly 40 is inserted into the inner bag 71 (into the airbag body 51) through the openings 69, 84 as shown in FIGS. 6 and 7 and is arranged to extend in the vehicle widthwise direction in a front portion (rearward of the openings 69, 84) of the inner bag 71 (the airbag body 51). The bolts 43 of the retainer 42 are inserted downward from above into the corresponding insertion holes 74, 55.

Further, as shown in FIGS. 6, 12 and 13, the wrap portions 53 of the airbag body 51 and the wrap portions 73 of the inner bag 71 are wrapped forward and downward along the outer peripheral surface of the inflator assembly 40. Due to the wrapping, the through holes 76 of the inner bag 71 are located below the inflator assembly 40 together with the through holes 57 of the airbag body 51. The bolts 43 of the retainer 42 are inserted into the through holes 76, 57 so that the wrap portions 73 of the inner bag 71 and the wrap portions 53 of the airbag body 51 are fixed to bolts 43. This closes the opening 69 of the airbag body 51 and the opening 84 of the inner bag 71, and the wrap portions 53, 73 are maintained in a wrapped state onto the inflator assembly 40.

As described above, the airbag module AM is formed by installing the inflator assembly 40 in the airbag 50. The airbag module AM is arranged and installed in the seat portion 10 of the vehicle seat S in the following manner.

<Arrangement of Airbag Module AM>

As shown in FIG. 4, a front portion of the airbag 50, in which the inflator assembly 40 is arranged, is accommodated in the accommodation recess 16A of the accommodation case 16. The airbag 50 except for its front portion is arranged between the seat cushion 17 and the support portion A, while being flatly deployed without being filled with inflation gas.

<Assembly of Airbag Module AM>

In FIG. 13, the bolts 43 are inserted through the insertion holes 74 and the through holes 76 of the inner bag 71 and through the insertion holes 55 and the through holes 57 of the airbag body 51, and protrude to the outside of the airbag 50. The bolts 43 are passed through the through holes 16B formed in the bottom of the accommodation recess 16A as shown in FIG. 4. Nuts 44 are threaded to the bolts 43 so that the inflator assembly 40 is fastened to the accommodation case 16, together with the airbag 50.

As described above, the airbag apparatus includes the impact sensor 95 and the control device 96 shown in FIG. 4, in addition to the airbag module AM. The impact sensor 95, for example, includes an acceleration sensor. The impact sensor 95 is attached to the front bumper (not shown) of the vehicle and detects an impact applied to the front bumper from front, thereby detecting a front collision. The control device 96 controls the inflator 41 based on a detection signal from the impact sensor 95.

The airbag apparatus of the present embodiment is constructed as described above. Operation of the airbag apparatus will now be described.

In the airbag apparatus, as long as no impact from front is applied to the front bumper due to, for example, a front collision, the control device 96 does not output a command signal to activate the inflator 41, and the inflator 41 does not supply inflation gas to the airbag 50. Therefore, most of the airbag 50 except for its front portion continues to be located between the support portion A and the seat cushion 17 in a flatly deployed state (refer to FIGS. 1 and 4).

In this state, the contact preventing member 90, which is fixed to the lower fabric portions 51L of the airbag body 51 is located between the lower fabric portions 51L and the support portion A. Therefore, even when the airbag 50 is in the non-inflated state, the lower fabric portions 51L is prevented from contacting the support portion A by the contact preventing member 90. The lower fabric portions 51L are prevented from being damaged by contact with the support portion A, particularly with pointed parts such as parts to which the engaging claws of the wire frame portions 15 are hooked.

When an impact is applied from front to the vehicle, an occupant P acts to move forward due to the inertia. At this time, the occupant P is restrained onto the seat portion 10 by the seat belt device 30. However, depending on the posture of the occupant P, the lumbar region PP may be disengaged from the lap belt portion 34 and move forward.

When the impact sensor 95 detects that an impact the magnitude of which is greater than a predetermined value is applied to the front bumper, the control device 96 outputs to the inflator 41 a command signal for activating the inflator 41 through the harness based on a detection signal. In response to the command signal, the inflator 41 generates and discharges high-temperature and high pressure inflation gas.

In the airbag 50, the inflation gas is first supplied to the first chamber 85, which has an inflator 41, as shown in FIGS. 12 and 13. In the first chamber 85, the inner bag 71 is located between the inflator 41 and the airbag body 51. Therefore, in the first chamber 85, the high-temperature and high-pressure inflation gas discharged by the inflator 41 is directly received by the inner bag 71. A part of the airbag body 51 that forms the first chamber 85 (the outer part of the inner bag 71) does not directly receive the high temperature and the high pressure of the inflation gas.

The inflation gas is supplied from the inflator 41 to the first chamber 85. The supplied inflation gas starts inflating the inner bag 71, and eventually, a part of the airbag body 51 that forms the first chamber 85 (parts outside the inner bag 71) is indirectly inflated as indicated by the alternate long and two short dashed lines in FIG. 12.

After the inner bag 71 is inflated to some extent, the inflation gas passes through the discharge holes 78 on the folding line 77 of the inner bag 71 is discharged to the second chamber 86, which does not accommodate the inflator 41 in the airbag 50. The supply rate of the inflation gas to the first chamber 85 is greater than the discharge rate of the inflation gas from the discharge holes 78.

In the present embodiment, the tether 87 of the inner bag 71 divides the interior of the airbag 50 into the first chamber 85 and the second chamber 86, and the position of the tether 87 is set such that the volume of the first chamber 85 is less than the volume of the second chamber 86. Thus, the first chamber 85, which has the smaller volume, is inflated in a relatively short time, and the pressure in the first chamber 85 is raised at an early stage. In turn the inflation gas in the first chamber 85 starts being discharged to the second chamber 86 through the discharge holes 78 at an early stage. As a result, the second chamber 86 starts being inflated at an early stage even though the airbag 50 is long in the front-rear direction and has a large volume.

The inner bag 71 is joined to the airbag body 51 at sides of the inner bag 71 in the vehicle widthwise direction by the peripheral joint portion 65 (the first peripheral joint portions 66 and the third peripheral joint portions 68). Thus, unlike the airbag of the prior art, in which the sides of the inner bag 71 are not joined to the airbag body 51, the shape of the inner bag 71 is unlikely to be changed even when receiving inflation gas from the inflator 41. This stabilizes the positions of the discharge holes 78, so that the inflation gas flows in a predetermined direction (rearward) in the second chamber 86. Also, the inner bag 71 is joined to the airbag body 51 by the upper inner joint portion 82 and the lower inner joint portion 83, which extend in the vehicle widthwise direction. The joint portions 82, 83 allow the inner bag 71 to maintain its shape even when receiving inflation gas. This stabilizes the posture of the inner bag 71, so that the inflation gas flows from the discharge holes 78 in a predetermined direction (rearward) in the second chamber 86.

When the first chamber 85 and the second chamber 86 are inflated by the inflation gas from the inflator 41, the inflation increases the distance in the up-down direction between the upper fabric portions 51U and the lower fabric portions 51L of the airbag body 51.

If there were no member for connecting the upper fabric portions 51U and the lower fabric portions 51L to each other in a middle portion of the airbag body 51, the airbag body 51 would be inflated greatly in the up-down direction when supplied with inflation gas (the airbag body 51 would be thick when inflated). The longer the airbag body 51 in the front-rear direction, the thicker the airbag body 51 becomes when inflated. In the case where the rear end 51R of the airbag body 51 is located below the rear portion of the seat portion 101 (the buttocks PB of the occupant P) as shown in the above described embodiment, the airbag body 51 is relatively long in the front-rear direction, and thus the airbag body 51 tends to be excessively thick when inflated.

In the above described embodiment, the inner bag 71 has the tether 87, which is located between the upper inner joint portion 82 and the lower inner joint portion 83, and the tether 87 is strained in the up-down direction as the distance between the upper fabric portions 51U and the lower fabric portions 51L increases, thereby limiting the inflation of the airbag body 51 in the direction of thickness (refer to the alternate long and two short dashed lines in FIG. 12).

As described above, the airbag 50 is inflated between the support portion A of the seat frame 11 and the seat cushion 17 with the inflation thickness of the airbag body 51 limited. The inflated airbag 50 pushes the seat cushion 17 upward, so that the seat face 10A of the seat portion 10 rises. Parts from the knees PN to the buttocks PB of the occupant P, who is restrained to the vehicle seat S by the seat belt device 30, are pushed upward by the raised seat face 10A. Particularly, the lumbar region PP of the occupant P, who is pushed up, is located at a position aligned with the lap belt portion 34 of the seat belt device 30. This increases the restraining force by the lap belt portion 34. Accordingly, the lumbar region PP of the occupant P is prevented from moving forward on the seat portion 10.

The contact preventing member 90 might hinder the inflation of the airbag 50.

In this regard, the contact preventing member 90, which is located between the airbag 50 and the support portion A, has a portion made of felt that is in the vicinity of the airbag 50. The felt is less flexible than the base fabric sheet 52 forming the airbag body 51, but more flexible than resin sheets. The felt part of the contact preventing member 90 that is close to the airbag 50 ensures the flexibility of the contact preventing member 90, thus allowing the contact preventing member 90 to be flexed to follow the inflation of the airbag 50. Therefore, the contact preventing member 90 is less likely to hinder inflation of the airbag 50.

A part of the contact preventing member 90 that is in the vicinity of the support portion A is made of a soft resin sheet. The resin sheet has a higher strength than felt. Since the soft resin sheet of the contact preventing member 90 contacts the support portion A, the airbag 50 is reliably prevented from contacting the support portion A during inflation of the airbag 50.

Although less than that of fabric and felt, the soft resin sheet has a predetermined flexibility. Therefore, the resin sheet is flexed to follow the inflation of the airbag 50, so that the contact preventing member 90 is less likely to hinder the inflation of the airbag 50.

Joint positions of the airbag 50 to which the contact preventing member 90 is fixed are harder than the parts to which the contact preventing member 90 is not fixed. Therefore, the joint positions of the airbag 50 to which the contact preventing member 90 is fixed is harder to flex than the parts to which the contact preventing member 90 is not fixed. Taking this into consideration, the contact preventing member 90 of this embodiment is joined to the non-inflation portion D of the airbag 50, and not to the inflation portion C. Thus, the joint positions the contact preventing member 90 do not significantly influence the flexibility of the inflation portion C of the airbag 50, so that the contact preventing member 90 is less likely to hinder the inflation of the inflation portion C. The non-inflation portion D is not inflated. Therefore, if the contact preventing member 90 is fixed to the non-inflation portion D and the non-inflation portion D is hardened, no particular drawbacks are brought about.

In a case where the contact preventing member 90 is formed by a single sheet as in the case of the present embodiment, a whole surface of the contact preventing member 90 may be fixed to the airbag 50. However, the greater the area of a part of the airbag 50 that is fixed to the contact preventing member 90, the greater the tendency that inflation of the airbag 50 is hindered becomes. In contrast, according to the present embodiment, the contact preventing member 90, which is made by a single sheet, is fixed to the airbag 50 at a plurality of separated positions. Therefore, the area of parts of the airbag 50 that are fixed to the contact preventing member 90 is small, and the contact preventing member 90 is less likely to hinder the inflation of the airbag 50.

Since the contact preventing member 90 is provided on a surface of the airbag 50 that faces the support portion A (the lower surface of the lower fabric portion 51L) when the airbag 50 is inflated, the contact preventing member 90 is always located between the airbag 50 (the lower fabric portion 51L) and the support portion A during the inflation of the airbag 50. The contact preventing member 90 prevents the airbag 50 (the lower fabric portion 51L) from contacting the support portion A. As a result, as in the non-inflation state of the airbag 50, the lower fabric portion 51L is prevented from being damaged by contact with the support portion A, particularly with pointed parts such as parts to which the engaging claws of the wire frame portions 15 are hooked.

The present embodiment described above has the following advantages.

(1) The airbag 50 is provided with the flexible contact preventing member 90, which is located on a surface of the airbag 50 that faces the support portion A when the airbag is inflated (the lower surface of the lower fabric portions 51L), and prevents the airbag 50 from contacting the support portion A (FIG. 4).

Therefore, the same advantage (prevention of contact between the airbag 50 and support portion A) is obtained as in the case where the contact prevention member 90 is arranged taking into consideration factors such as the length of the airbag 50 when deployed. Therefore, aside from the arrangement and design of the airbag 50, there is no need to arrange or design the contact preventing member 90 taking into consideration the deployment distance of the airbag 50. This simplifies the design procedure of the airbag apparatus.

(2) The airbag 50 is formed by the inflation portion C, which is inflated by inflation gas supplied by the inflator 41, and the non-inflation portion D, which is not supplied with inflation gas and not inflated. The contact preventing member 90 is fixed to the airbag 50 at the non-inflation portion D (FIGS. 5 and 11).

Joint positions of the airbag 50 to which the contact preventing member 90 is fixed are harder than the parts to which the contact preventing member 90 is not fixed. However, the hardened contact preventing member 90 is prevented from hindering the inflation of the inflation portion C.

(3) The contact preventing member 90 is formed by a single sheet and fixed at a plurality of separated joint positions B1 to B4 on the airbag 50 (the lower fabric portion 51L of the airbag body 51) as shown in FIGS. 5 and 6.

Therefore, the area of parts of the airbag 50 that are fixed to the contact preventing member 90 is small, and the contact preventing member 90 is less likely to hinder the inflation of the airbag 50.

(4) A part of the contact preventing member 90 that is in the vicinity of the airbag 50 is made of felt.

Therefore, the flexibility of the contact preventing member 90 is guaranteed by the felt, and the contact preventing member 90 is easily flexed to follow the inflation of the airbag 50.

(5) A part of the contact preventing member 90 that is in the vicinity of the support portion A is made of a soft resin sheet.

Therefore, the airbag 50 is reliably prevented from contacting the support portion A at least during inflation of the airbag 50. The soft resin sheet is flexible and is therefore flexed to follow the inflation of the airbag 50. This minimizes the tendency that the contact preventing member 90 hinders the inflation of the airbag 50.

(6) The contact preventing member 90 is thermally welded to the airbag 50.

Thus, the contact preventing member 90 can be firmly joined to the airbag 50 at the joint positions.

(7) The airbag 50 is arranged between the support portion A and the seat cushion 17 in a flatly deployed state, without being filled with inflation gas. The contact preventing member 90 is arranged on a surface of the airbag 50 that faces the support portion A (the lower surface of the lower fabric portions 51L) as shown in FIG. 4.

Therefore, even when the airbag 50 is in the non-inflated state, the airbag 50 is prevented from contacting the support portion A by the contact preventing member 90.

The present invention may be modified as in the following additional embodiments.

The joint portions (the endless joint portion 56, the upper arcuate joint portion 63, the lower arcuate joint portion 64, the peripheral joint portion 65, the loop-like joint portions 75, 81, the annular joint portion 79, the upper inner joint portion 82, and the lower inner joint portion 83) may be formed by a method other than sewing using sewing threads, but may be formed by, for example, using an adhesive or welding.

The airbag body 51 and the inner bag 71 may be installed in the seat portion 10 (between the seat cushion 17 and the seat frame 11) in a folded state.

In the above illustrated embodiment, only a part of the contact preventing member 90 that is close to the airbag 50 is made of felt. However, the entire contact preventing member 90 may be formed of felt.

In the above illustrated embodiment, only a part of the contact preventing member 90 that is close to the support portion A is made of a soft resin sheet. However, the entire contact preventing member 90 may be formed of a soft resin sheet.

Instead of felt and a soft resin sheet shown above, the contact preventing member 90 may be formed of a different material such as fabric, paper, or cushioning material.

The contact preventing member 90 may be fixed to the inflation portion C of the airbag 50. The contact preventing member 90 may be fixed to both of the inflation portion C and the non-inflation portion D.

The contact preventing member 90 may be formed of a plurality of sheets. In this case, the contact preventing member 90 may be provided only at parts of the airbag 50 that are likely to be damaged by contact with the support portion A.

The contact preventing member 90 may be fixed to the airbag 50 by fixing method other than thermal welding.

The present invention may be applied to a seat cushion airbag apparatus that uses an airbag 50 having a different structure than the one illustrated above.

The present invention may be applied to a wide variety of seat cushion airbag apparatuses as long as at least a part of an airbag 50 is inflated between a support portion A and a seat cushion 17.

The object to be restrained by the present invention does not need to be an occupant P, but may be, for example, a piece of baggage. In a case where a piece of baggage is placed as an object to be restrained on the seat portion 10, the same advantages as the above embodiment are achieved.

The seat cushion airbag apparatus according to the present invention may be applied to a vehicle seat S that is oriented in a direction other than the vehicle front-rear direction, for example, a direction perpendicular to the vehicle front-rear direction (the vehicle widthwise direction) when an occupant P is seated.

The seat cushion airbag apparatus according to the present invention may be applied to any vehicle seats including front seats and rear seats.

An inflation fluid generator having a structure different than that of the inflator 41 may be employed. Also, an inflation fluid other than inflation gas may be used.

Therefore, the present examples and embodiments are to be considered as illustrative and not restrictive and the invention is not to be limited to the details given herein, but may be modified within the scope and equivalence of the appended claims.

The invention claimed is:

1. A seat cushion airbag apparatus applied to a vehicle seat having a seat portion, the seat portion having a seat cushion that is supported from below by a support portion of a seat frame,
   wherein the seat cushion airbag apparatus raises a seat face of the vehicle seat, thereby restraining an object on the seat face so that the object is prevented from moving forward,
   the seat cushion airbag apparatus comprising:
   an airbag arranged between the support portion of the seat frame and the seat cushion;
   an inflation fluid generator that supplies inflation fluid for inflating at least a part of the airbag between the support portion of the seat frame and the seat cushion, thereby raising the seat face; and
   a contact preventing member arranged between the support portion of the seat frame and the airbag, wherein a part of the contact preventing member that is in the vicinity of the support portion is flexible, and the contact preventing member prevents the airbag from contacting the support portion of the seat frame when the airbag is inflated, wherein
   the airbag has an inflation portion that is supplied with the inflation fluid from the inflation fluid generator and inflated and a non-inflation portion that is not supplied with the inflation fluid and not inflated, and
   the contact preventing member is fixed to the non-inflation portion of the airbag.

2. The seat cushion airbag apparatus according to claim 1, wherein the contact preventing member is formed by a single sheet, and the sheet is fixed to a plurality of positions of the airbag that are separated from each other.

3. The seat cushion airbag apparatus according to claim 1, wherein at least a part of the contact preventing member that is in the vicinity of the airbag is made of felt.

4. The seat cushion airbag apparatus according to claim 3, wherein the contact preventing member is thermally welded to the airbag.

5. The seat cushion airbag apparatus according to claim 1, wherein at least a part of the contact preventing member that is in the vicinity of the support portion is made by a soft resin sheet.

6. The seat cushion airbag apparatus according to claim 5, wherein the contact preventing member is thermally welded to the airbag.

7. The seat cushion airbag apparatus according to claim 1, wherein the airbag is arranged between the support portion and the seat cushion in a deployed state, without being filled with inflation gas, and
   the contact preventing member is arranged on a surface of the airbag that faces the support portion.

* * * * *